United States Patent [19]

Utagawa

[11] Patent Number: 4,544,255
[45] Date of Patent: Oct. 1, 1985

[54] FOCUS DETECTOR

[75] Inventor: Ken Utagawa, Tokyo, Japan

[73] Assignee: Nippon Kogaku K. K., Japan

[21] Appl. No.: 671,064

[22] Filed: Nov. 13, 1984

Related U.S. Application Data

[63] Continuation of Ser. No. 527,386, Aug. 29, 1983, abandoned.

[30] Foreign Application Priority Data

Sep. 3, 1982 [JP] Japan .................. 57-153632

[51] Int. Cl.$^4$ ............................................. G03B 3/00
[52] U.S. Cl. ................................... 354/406; 250/204
[58] Field of Search ................. 354/402, 406, 407; 250/201 PF, 204

[56] References Cited

U.S. PATENT DOCUMENTS 4,384,770 5/1983 Tokutomi et al. ................. 354/407

Primary Examiner—William B. Perkey
Attorney, Agent, or Firm—Shapiro and Shapiro

[57] ABSTRACT

A focus detector adaptable to a camera or other similar optical instrument is disclosed. The focus detector includes a pair of concave mirrors as refocusing optical system for forming secondary images the positional relationship of which is detected for focus detection. In order to eliminate the adverse effect of aberrations on the secondary image formation and to improve the accuracy of focus detection, the concave mirrors are inclined to satisfy a particularly determined condition on the incident angle to the mirrors. The condition is that the incidence angle should be less than about $\sqrt{0.04/R}$ wherein R is the maximum diameter of the mirror measured in mm.

24 Claims, 40 Drawing Figures

FOCUS DETECTOR

This is a continuation application of Ser. No. 527,386, filed Aug. 29, 1983, now abandoned.

BACKGROUND OF THE INVENTION

1. Field of the Invention

The present invention relates to a focus detector for use in optical instruments such as cameras. More particularly, the present invention relates to such type of focus detector in which a pair of refocusing (image-reforming) optical systems and a pair of photo receptors are provided to detect the focus of a main image-forming optical system. An object image formed by the main image-forming optical system is refocused, namely image-reformed on the pair of photo receptors through the pair of refocusing systems respectively so that the focus of the main image-forming optical system can be detected by detecting the existing relative positional relationship between the refocused images on the pair of photo receptors.

2. Description of the Prior Art

A known optical arrangement of the above-mentioned type of focus detector for cameras is shown in FIG. 1 in which FIG. 1A is a front view of the optical system of the prior art focus detector for cameras and FIG. 1B is a plan view thereof.

In FIG. 1, 1 is a photographic lens and 2 is a predetermined focal plane of the lens 1. A field lens 3 is disposed in or near the predetermined focal plane 2. The predetermined focal plane 2 is located at or near a position conjugated with a film. 4A and 4B are a pair of refocusing lenses. 5 denotes a plane conjugated with the predetermined focal plane 2 in regard to the pair of refocusing lenses 4A and 4B. On the conjugate plane 5 there are image position detecting photo-electric sensors 6A and 6B. The photographic lens 1 forms an image of an object on the predetermined focal plane 2. Each of the refocusing lenses 4A and 4B forms a secondary image of the object image on the conjugate plane 5. For the purpose of this specification, the predetermined focal plane 2 is referred to as the primary image plane and the conjugate plane 5 as the secondary image plane.

2A denotes a rectangular area in the primary image plane 2. The center of the rectangular area 2A lies on the optical axis 0 of the photographic lens. This area 2A is an area used for the detection of focus. Therefore, this area 2A is referred to as the primary image plane detection area. Areas 5A and 5B on the secondary image plane 5 are conjugate with the primary image plane detection area 2A. The conjugate area 5A or 5B is referred to as the secondary image plane detection area. The secondary image plane detection area 5A is coincident with the light reception surface of the photo-electric sensor 6 and the secondary image plane detection area 5B is coincident with the light reception surface of the photo-electric sensor 6B. When the photographic lens 1 is moved along the optical axis 0, the object image formed by the lens 1 moves also along the optical axis 0. Consequently, the secondary images formed by the refocusing lenses 4A and 4B move on the secondary image plane at the same time. The state of the focus adjustment of the photographic lens 1 can be detected by detecting the relative positions of the secondary images on the photo-electric sensors 6A and 6B.

However, this type of prior art focus detector has an important disadvantage in that it needs a very voluminous optical system 7 as indicated by the broken line in FIG. 1A. The volume of the focus detection optical system 7 is too large to as received in the camera body.

To reduce the size of the focus detector it has already been proposed to replace the refocusing lenses by concave mirrors. A typical example of such a reflection type focus detection optical system is disclosed, for example, in the specification of U.S. Pat. No. 4,384,770. The basic arrangement of this reflection type focus detection optical system will hereinafter be described with reference to FIG. 2.

In FIG. 2, the concave mirrors 8A and 8B are behind the above-mentioned rectangular primary image plane detection area 2A and are disposed approximately symmetrically relative to the optical axis of the photographic lens 1. 9A and 9B denote the secondary image plane detection areas in which secondary images are formed by the concave mirrors 8A and 8B respectively. In this case, it is required to avoid the overlap of the secondary image plane detection areas 9A, 9B and the primary image plane detection area 2A. To this end, the optical axis of each concave mirror is inclined relative to the plane defined by the center of the primary image plane detection area and the centers of areas of the concave mirrors 8A and 8B. Herein the optical axis of the concave mirror is defined as the normal line extending from the center area of the mirror. More specifically, the optical axis of the concave mirror 8A is inclined down by an angle $\phi$ relative to the plane defined by the three centers whereas the optical axis of the concave mirror 8B is inclined up by $\phi$ relative to the plane as seen in FIGS. 2B and C. By this inclination, the secondary image plane detection area 9A relating to the concave mirror 8A is formed in an area downwardly spaced from the primary image plane detection area 2A and the secondary image plane detection area 9B relating to the concave mirror 8B is formed in an area upwardly spaced from the primary image plane detection area 2A. To detect the displacement of the secondary image, a photo-electric sensor device is provided in each the secondary image plane detection areas 9A and 9B.

With the above arrangement, the reflection type focus detector has a size considerably smaller than the first mentioned prior art focus detector having a pair of refocusing lenses. However, this reflection type focus detector has a problem in that the quality of the secondary image formed therein is degraded due to the inclined arrangement of the concave mirrors. There is the possibility that the identity of the secondary image with the primary one may be impaired to a great extent. Hereinafter a further detailed explanation of the problem will be made with reference to FIG. 2.

Regarding the rays of light coming from the center of the primary image plane detection area 2A to impinge upon the centers of the concave mirrors 8A and 8B and then to reach the centers of the secondary image plane detection areas 9A and 9B, the sum of the incident angle to the concave mirror and the reflection angle by the mirror is referred to as the deflection angle. As will be understood from FIGS. 2B and C, the deflection angle is $2\phi$, that is, twice the angle of the above-described inclination $\phi$. This deflection angle has a large adverse effect on the image-forming performance of the concave mirror. The aberration of the concave mirror varies in magnitude with the deflection angle. More concretely, coma increases in proportion to the deflection angle $\phi$. Astigmatism increases in proportional to $\phi^2$.

As will be described in detail later, the deflection angle of beams coming from points other than the center of the primary image plane detection area 2A becomes larger with the distance from the center. Therefore, the degradation of the secondary image caused by aberration becomes most severe at the edge portion of the area.

In this manner, in the case of the prior art reflection type focus detection optical system, the astigmatism of the concave mirror is greatly increased with increasing inclination of the mirror, thereby degrading the secondary image to a great extent. The accuracy of detection of the relative position of the secondary images by the pair of photo-electric sensors is greatly reduced thereby. With this type of prior art focus detector, therefore, it is impossible to attain the focus detection with desired high accuracy.

For photo-electrical detection bright secondary images which have high illuminance are required. Generally, a bright secondary image can be obtained by use of a concave mirror having a larger diameter. However, the use of such a concave mirror having a larger diameter exacerbates the problem of the degradation of the secondary image as described above.

SUMMARY OF THE INVENTION

Accordingly it is an object of the present invention to provide a focus detector in which the secondary images can not be adversely affected by the inclination of the concave mirrors in practice.

It is another object of the invention to provide a focus detector in which bright secondary images can be obtained without the problem of degradation of image quality.

Other and further objects, features and advantages of the invention will appear more fully from the following description taken in connection with the accompanying drawings.

BRIEF DESCRIPTION OF THE DRAWINGS

FIG. 11 is a view showing the relationship between the exit pupil of the photographic lens and the areas where the focus detecting beam passes through.

DESCRIPTION OF PREFERRED EMBODIMENTS

At first an embodiment of a focus detector adopted for a single lens reflex camera according to the invention will be described with reference to FIGS. 3, 4 and 5.

Figure 3A:
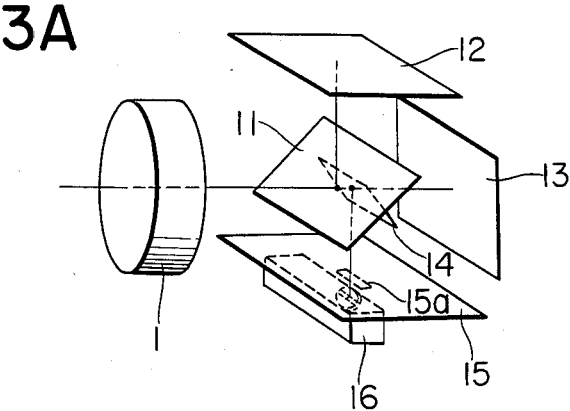
FIGS. 3A and 3B are perspective views of an embodiment of the present invention in which a focus detector according to the invention is incorporated in a single lens reflex camera.

Referring first to FIG. 3A light transmitted through a photographic lens 1 from an object falls on a quick return mirror 11. The mirror 11 reflects a part of the incident light toward a focusing plate 12 of the camera finder. The remainder of the light passes through the mirror 11 and impinges on a sub-mirror 14 in front of the film plane 13. The sub-mirror 14 reflects the light downwardly to the bottom of the mirror box. In the bottom plate 15 of the mirror box there is provided a rectangular opening 15a under which a reflection type focus detection optical block 16 is located. The optical block 16 is an elongated member which has a cylindrical or prism-like shape and is disposed with its longitudinal axis parallel to the bottom plate 15 but at right angles (90°) relative to the optical axis of the lens 1 directed to the film 13.

Figure 4:
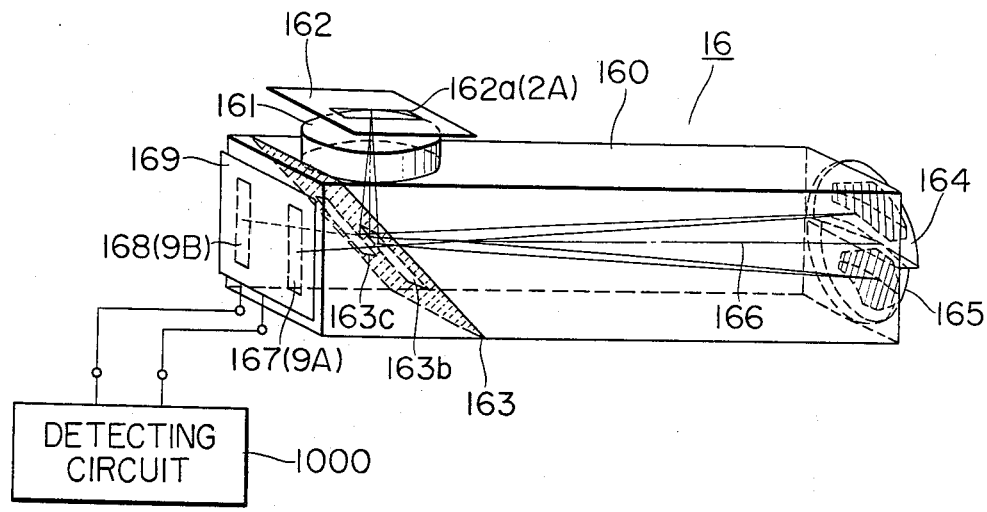
FIG. 4 is a perspective view of the embodiment.

The detailed structure of the optical block 16 is shown in FIGS. 4 and 5.

In FIGS. 4 and 5, the main body of the focus detection optical block 16 is designated by 160. The main body 160 is a transparent rectangular parallelopiped block made of glass or plastics having a refractive index n (n>1). The transparent block 160 has a plano-convex field lens 161 cemented to the upper surface of the block 160 at the portion near the left-hand end of the block. The lens 161 is cemented on the plane surface thereof to the transparent block 160. On the side of the convex surface of the lens 161 there is provided a slotted screen plate 162 nearly in touch with the apex of the convex surface. The screen plate 162 is disposed in or close to the predetermined focal plane of the photographic lens 1, that is, the primary image plane. The rectangular opening 162a formed in the middle of the screen plate 62 is so measured as to be a little larger than the primary image plane detection area 2A and the opening 162a is located directly under the opening 15a in the bottom plate 15 shown in FIG. 3. Therefore, it may be said that the rectangular opening 162a virtually defines the primary image plane detection area 2A. The bottom plate 15 of the mirror box may be substituted for the screen plate 162.

Figure 5A:
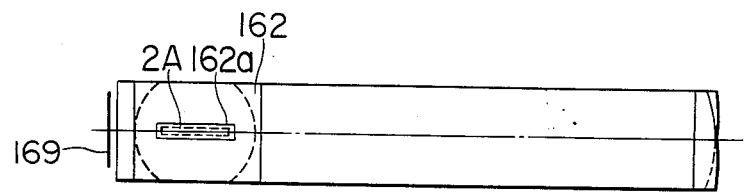
FIGS. 5A, 5B, 5C, 5D and 5E are plan view, front view, bottom view, right side view and left side view of the embodiment.
Figure 5B:
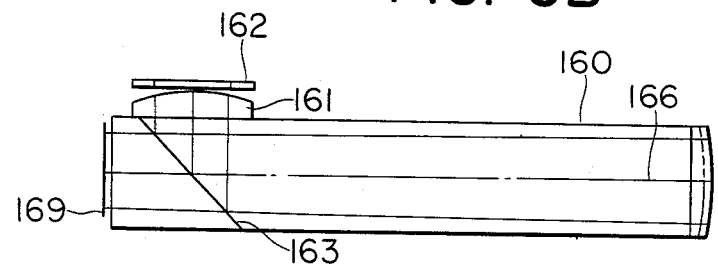
Figure 5C:
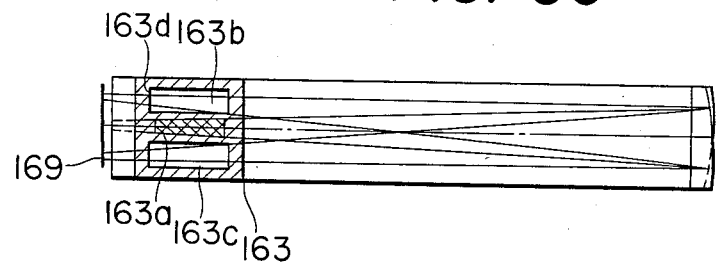

In the transparent block 160 under the field lens 161 there is a reflecting member 163 slanted at about 45°. The structure of the slant reflecting member 163 is seen in FIG. 5C which is a bottom view of the block 160. The reflecting member 163 is composed of a reflecting surface (double-hatched portion) 163a, light transmitting portions 163b, 163c and a light absorbing portion 163d. The reflecting surface 163a extends along the longitudinal axis of the block 160. The light transmitting portions 163b and 163c are on both sides of the central reflecting surface. The remainder of the reflecting member 163 constitutes a light absorbing portion 163d. The size of the reflecting surface 163a is so selected as to reflect only the focus detecting beam limited by the opening 162a serving as the primary image plane detection area. Rays other than the focus detecting beam are absorbed by the light absorbing part 163d to reduce stray light. This reflecting member 163 can be made, for example, in the following manner:

The transparent block 160 is obliquely cut into two parts along the line predetermined for the reflecting member. On the exposed oblique surface of one of the two parts there is formed a reflecting film layer 163a and a light absorbing film layer 163d employing any suitable technique such as vapor deposition. Thereafter the two parts are cemented to each other again.

Figure 5D:
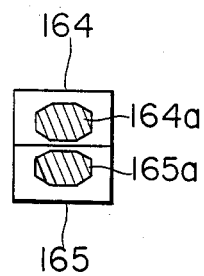
Figure 5E:
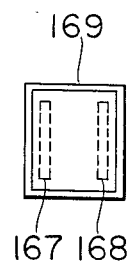

Referring again to FIG. 4, the transparent block 160 has a pair of concave mirror blocks 164 and 165 cemented to the right-hand end surface of the block 160. The two concave mirror blocks 164 and 165 are juxtaposed vertically symmetrically with respect to the imaginary optical axis 166 of the focus detection optical system. The concave mirror blocks 164 and 165 are made of a transparent material having a refractive index n. The mirror blocks 164, 165 are so shaped as to have a plane surface on the side cemented to the main block 160 and a convex spherical surface on the other side. In the convex spherical surface of the mirror block 164 there is formed a reflecting surface 164a as shown in FIG. 5D and in the convex spherical surface of the mirror block 165 there is formed a reflecting surface 165a. These reflecting surfaces 164a and 165a serve as concave mirrors. They are inclined at a predetermined angle in such manner that the secondary image plane detection areas formed by the two reflecting surfaces 164a and 165a do not overlap each other and do not interfere with the primary image plane detection area 162a. Concretely speaking, the concave mirrors 164 and 165 reflect the beam coming from the reflecting surface 163a toward the left-hand end surface of the block 160 so as to form thereon the secondary image plane detection areas 9A and 9B spaced from each other by a predetermined distance. A photo-electric sensor 167 is provided on the secondary image plane detection area 9A and a photo-electric sensor 168 is provided on the area 9B. Therefore, the light reception surface of the photo-electric sensor 167 is conjugate with the primary image plane detection area 2A relative to the concave mirror 164. Similarly, the light reception surface of the photo-electric sensor 168 is conjugate with the primary image plane detection area 2A relative to the concave mirror 165. With this arrangement, the light coming from the reflecting surface 163a and impinging upon the concave mirror 164a is focused on the light reception surface of the sensor 167 after being reflected by the concave mirror 164 and transmitted through the light transmitting part 163b of the slant member 163. On the other hand, the light falling upon the concave mirror 165 from the reflecting surface 163a is focused on the light reception surface of the sensor 168 after being reflected by the concave mirror 165a and transmitted through the light transmitting part 163c.

The photo-electric sensors 167 and 168 have the same structure, which is composed of a one-dimensional photo-toelectric element array having a number of photo-electric elements vertically arranged thereon. These two arrays 167 and 168 are formed on a common semiconductor substrate 169 which is bonded to the left-hand end surface of the block 160. The output terminals of the substrate 169 are connected to a detection circuit 1000 which receives the respective outputs of the photo-electric sensors 167 and 168 to form a focus detection signal.

The field lens 161 has a particularly selected lens power. The lens power is selected in such manner that the reflecting surfaces 164a, 165a of the concave mirrors 164, 165 are approximately conjugated with the exit pupil of the photographic lens 1.

An example of the making method of the above described inclined concave mirror blocks 164, 165 will be described with reference to FIG. 6.

Figure 6A:
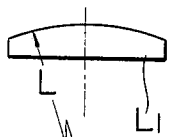
FIGS. 6A and 6B illustrate, in front view and in plan view, how to make a pair of concave mirrors.
Figure 6B:
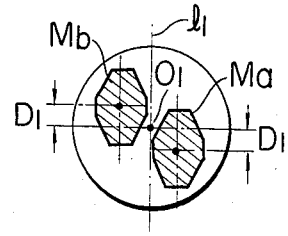

Let the distance from the primary image plane to the concave mirror be L. The convex surface of a plano-convex lens L1 has a curvature radius of about L as shown in FIG. 6A. On the convex surface of the lens L1 there is formed two reflecting surfaces Ma and Mb on both sides of the axis l1 passing through the center of the convex surface as shown in FIG. 6B. The center of the mirror surface Ma is spaced from the center O1 of the convex surface by a distance $D1 = \phi \cdot L$ in one direction and the center of Mb is spaced from the center O1 by the same distance D1 in the opposite direction. After forming the two mirror surfaces Ma and Mb in this manner, the lens L1 is cut into two pieces along the axis l1. A pair of separate plano-convex lenses is obtained thereby. These separate lenses each having a mirror surface formed therein are cemented to the main block 160 in the positions as shown in FIGS. 4 and 5D in which the two mirror surfaces Ma and Mb are symmetric with regard to the center axis 166 of the optical path of the block 160.

The above method of making concave mirror blocks has the advantages that the necessary inclination angle $\phi$ of the concave mirror is automatically given and the fine adjustment of the angle can be attained in a very simple manner by displacing the pair of separate plano-convex lenses a small distance before cementing while keeping their plane surfaces in close contact with the end surface of the block 160. If the concave mirror block 164 and 165 are made as a one-piece block having two such convex surfaces inclined differently by one-piece molding of plastics, then the adjustment can be done more easily.

The manner of operation of the above embodiment is as follows:

The light from an object transmitted through the photographic lens 1 forms a primary image of the object on, in front of or behind the screen plate 162. The beam of light from the object further passes through the slit opening 162a of the screen and then is reflected by the reflecting surface 163a of the slant reflecting member 163. The reflected beam is incident upon the pair of concave mirrors 164 and 165. The concave mirror 164 reflects the incident beam thereon and deflects it by a deflection angle of $2\phi$ according to the inclination $\phi$ of the mirror in one direction. Similarly, the concave mirror 165 reflects the incident beam thereon and deflects it by a deflection angle $2\phi$ in an opposite direction. Thus, the beam reflected by the concave mirror 164 passes through the light transmitting part 163b of the member 163 and then forms a secondary image on the photo-electric sensor 167. On the other hand, the beam reflected by the other concave mirror 165 passes through the other light transmitting part 163c and then forms a secondary image on the other photo-electric sensor 168. The positional relationship between the formed secondary images is detected by the sensors 167, 168 and the detection circuit 1000. Thereby the existing state of the focus adjustment of the photographic lens 1 can be detected.

As previously noted, to detect the positional relationship between the pair of secondary images with high detection accuracy, it is essential to form high quality secondary images on the sensors 167 and 178 by the concave mirrors 164 and 165. Degradation of the image quality is mainly caused by aberrations the magnitude of which becomes larger with increasing inclination of the concave mirrors 164 and 165 and, therefore, with increasing deflection angle $2\phi$ of the reflected beam as previously mentioned. Therefore, for the above shown reflection type focus detection optical system it is required to find out the conditions under which a sufficiently high detection accuracy can be assured. The conditions will be described hereinafter.

As previously noted, astigmatism is greatly affected by the deflection angle $2\phi$. Therefore, the relationship between deflection angle and astigmatism will be considered first with reference to FIG. 7.

Figure 7:
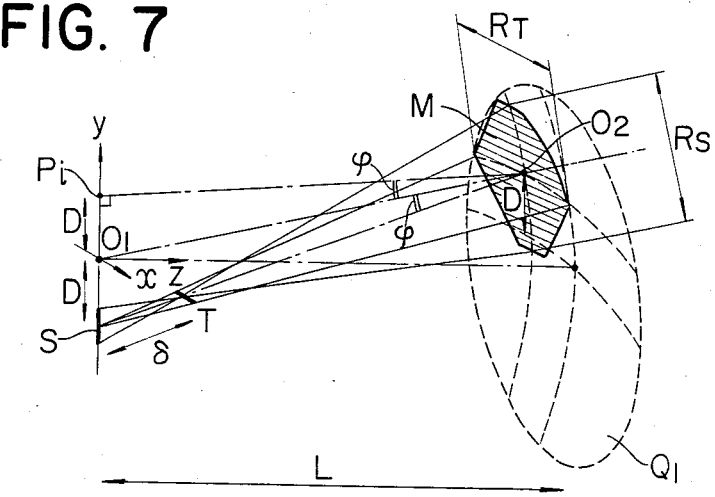
FIG. 7 is an optical diagram showing the astigmatism of the concave mirror.

In FIG. 7 there is shown an imaginary spherical surface Q1. The radius of curvature of the imaginary spherical surface Q1 is L and the center of curvature lies at the origin of coordinate axes x, y, z. A concave mirror M is formed on the spherical surface Q1 with the center 02 of the mirror M being spaced from the coordinate axis z by a predetermined distance. The distance measured in the y-direction is D. Considering a beam toward the center 02 of the mirror M from a point Pi distant from the origin 01 by a distance D in the y-direction, the incident angle of the beam to the mirror center 02 is $\phi$ (radian). Naturally the beam is reflected at reflection angle $\phi$, and focused at a point near the position substantially symmetric to the point Pi in respect to the origin 01. However, due to astigmatism, the image appears linearly on the y-axis as an image S formed by the sagittal beam on one hand and also appears linearly as an image T formed by the tangential beam at the twist position intersecting the image S at a right angle. When $\phi$ is small, the distance $\delta$ (mm) between the images S and T is given by:

$$\delta \approx 2 \cdot L \left( \frac{1}{\cos \phi} - \cos \phi \right) \approx 2L\phi^2 \quad (1)$$

Comparing the triangle formed by the diameter Rs (mm) of the mirror M measured in the y-direction as the base of the triangle and the center of the image T as the apex of the triangle to the triangle formed by the image S (base) and the center of the image T (apex), it is obvious that the two triangles are analogous to each other.

Since the two triangles are analogous to each other and $\delta << L$, the size $l_s$ (mm) of the formed sagittal image S is given by:

$$l_s \approx \delta \cdot \frac{R_s}{L} \quad (2)$$

Similarly, since the triangle formed by the center of the image S (as apex) and the image T (as base) is analogous to the triangle formed by the center of the image S (as apex) and the diameter $R_T$ of the mirror M in the x-direction (as base), the size $l_T$ of the tangential image T is given by:

$$l_T \approx \delta \cdot \frac{R_T}{L} \quad (3)$$

Substituting the above (1) in (2) and (3) gives:

$$l_s \approx 2R_s \cdot \phi^2 \quad (4)$$

$$l_T \approx 2R_T \cdot \phi^2 \quad (5)$$

Let Rm denote the larger one of the diameters Rs and $R_T$ of the concave mirror M. Then, from the above equations (4) and (5), the amount of astigmatism $l_m$ for the larger one is given by:

$$l_m = 2 \cdot Rm \cdot \phi^2 \quad (6)$$

Therefore, $$\phi = \sqrt{l_m/(2 \cdot Rm)} \quad (7)$$

For the above-mentioned type of focus detector according to the present invention in which the relative position of a pair of secondary images on photo-electric sensors is detected, it has been found that the desired detection of relative position between the secondary images is possible if the amount of astigmatism is in the order of 0.08 mm. From equation (7) the condition required to reduce the astigmatism at the center of the secondary image detection area to a value smaller than about 0.08 is:

$$\phi \lesssim \sqrt{0.04/Rm} \quad (8)$$

When the inclination and the maximum diameter of the concave mirror are suitably set in such manner that the deflection angle $2\phi$ of the beam impinging upon the center of the concave mirror from the center of the primary image plane detection area and the maximum diameter Rm of the mirror satisfy the condition of the formula (8), the astigmatism can be subdued sufficiently to attain a correct detection of focus.

A higher detection accuracy is attainable if the astigmatism at the center of the secondary image plane detection area is reduce to a value smaller than 0.04 mm. the condition required therefor is:

$$\phi \lesssim \sqrt{0.02/Rm} \quad (9)$$

An extremely high accuracy of focus detection is attainable if the astigmatism is reduced to a value smaller than 0.02 mm. The condition required therefore is:

$$\phi \lesssim \sqrt{0.01/Rm} \quad (10)$$

The lowest limit of the deflection angle $2\phi$ is automatically determined by the condition required to separate the secondary image plane detection areas from the primary image plane detection area.

In the above, there has been discussed the relationship between astigmatism and deflection angle at the center of the secondary image detection area at which the minimum astigmatism exists. Regarding astigmatism over the whole detection area the following discussion is presented:

Among all the rays falling at the center of the concave mirror from the primary image detection area 2A, the beam coming from the marginal portion of the area 2A has the largest deflection angle, as can readily be understood from the drawing of FIG. 2. Let the deflection angle of such a marginal beam be $2\phi$ m. Then, the deflection angle of the marginal beam, $2\phi$ m and the deflection angle of the central beam, $2\phi$ will hold the following relationship therebetween:

$$\phi_m^2 = \phi^2 + \left(\frac{Lw}{2L}\right)^2$$

wherein, Lw is the width of the primary image plane detection area and Lw/2L is the angle which the center of the detection area, the center of the concave mirror and the marginal portion (edge) of the detection area form.

The magnitude of astigmatism at the marginal portion of the secondary image detection area, lm can be found by using $\phi_m^2$ in place of $\phi^2$ in equation (6). Thus, it is given by:

$$lm = 2 \cdot Rm \cdot \phi_m^2 = 2Rm\left\{\phi^2 + \left(\frac{Lw}{2L}\right)^2\right\} \quad (11)$$

In this manner, the amount of astigmatism lm at the marginal portion of the detection area also can be expressed by $2\phi$, that is, the deflection angle of the central beam.

Rearrangement of the equation (11) gives:

$$\phi = \sqrt{lm/(2Rm) - (Lw/2L)^2} \quad (12)$$

From the above, it is concluded that the conditions on the deflection angle required to make the amount of astigmatism less than about 0.08 mm, about 0.04 mm and about 0.02 mm for the whole detection area are:

$$\phi \lesssim \sqrt{0.04/Rm - (Lw/2L)^2}, \quad (13)$$

$$\phi \lesssim \sqrt{0.02/Rm - (Lw/2L)^2} \text{ and} \quad (14)$$

$$\phi \lesssim \sqrt{0.01/Rm - (Lw/2L)^2} \quad (15)$$

respectively.

Figure 8:
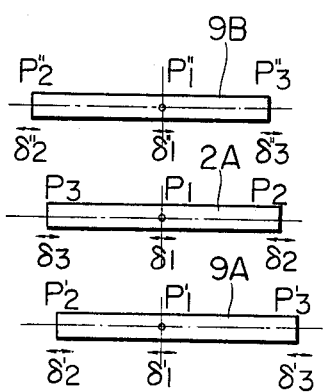
FIG. 8 illustrates the distortion aberration of the secondary image plane detection area.

Another aberration which has a large adverse effect on the accuracy of focus detection by the above shown type of focus detector employing a refocusing optical system is distortion present in the focus detection optical system. Due to distortion, the ratio of the distance between two points on the secondary image plane to the distance between the corresponding two points on the primary image plane, namely magnification ratio, varies position by position. FIG. 8 illustrates this problem.

Referring to FIG. 8, three points P1, P2 and P3 are shown on the primary image plane detection area 2A. Of the three points, P1 is at the center of the detection area 2A, P2 is at the right-hand edge and P3 is at the left-hand edge of the detection area 2A. By the concave mirror 164 as described above, images of these three points of P1, P2, P3 are formed on the secondary image plane detection area 9A at the corresponding three points $P_1'$, $P_2'$, $P_3'$ respectively. Similarly images of P1, P2, P3 are formed on the secondary image plane detection area 9B at the corresponding points $P_1''$, $P_2''$, $P_3''$ respectively by the other concave mirror 165. However, regarding any arbitrary length $\delta_1$ at P1, images of it formed at the corresponding points $P_1'$ and $P_2''$ have different lengths $\delta_1'$ and $\delta_1''$. Similarly, $\delta_2$ at P2 and $\delta_3$ at P3 on the primary image plane detection area 2A are projected on the secondary image plane detection areas 9A and 9B to form images having different lengths $\delta_2'$, $\delta_2''$ at $P_2'$, $P_2''$ and images having different lengths $\delta_3'$, $\delta_3''$ at $P_3'$, $P_3''$ respectively. In the example shown in FIG. 8, the secondary image 9A becomes larger in magnification on the right-hand side of the center $P_1'$. On the contrary, the secondary image 9B becomes larger in magnification on the left-hand side. Such distortion has an adverse effect on the detection of relative position of secondary images and therefore on the focus detection. The adverse effect should be eliminated or minimized. This may be attained by use of a particular arrangement of photoelectric element array. More concretely, such element array is used to detect the secondary images 9A, 9B in which the pitch of every photoelectric element in the array is changed according to the magnification proper to the local detection position corresponding to the element, that is to say, according to the magnitude of distortion proper to the local position. The elements in the two element arrays are to be arranged in such manner that the images of the two element arrays formed by the concave mirrors 164 and 165 on the primary image plane completely overlap each other with respect to every element and that the images of the elements have the same pitch. Such arrangement of photoelectric element array is shown in FIG. 9.

Figure 9:
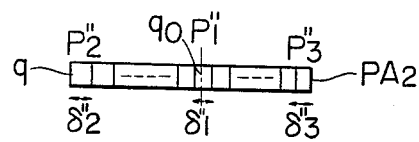
FIG. 9 shows an embodiment of a photoelectric sensor array designed to take into consideration the above distortion.
Figure 9:
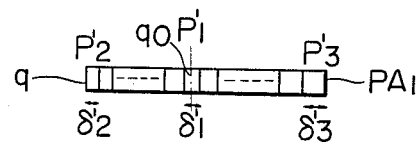

In FIG. 9, PA1 is a photoelectric element array provided to detect the secondary image 9A. PA2 is a photoelectric element array provided to detect the secondary image 9B. In the element array PA1 the pitch at which elements q are arranged is larger on the right-hand side of the center element qo than on the left-hand side. On the contrary, in the element array PA2 the pitch is larger on the left-hand side than on the right-hand side. By this arrangement of elements the effect of distortion as described above can be compensated.

Figure 1A:
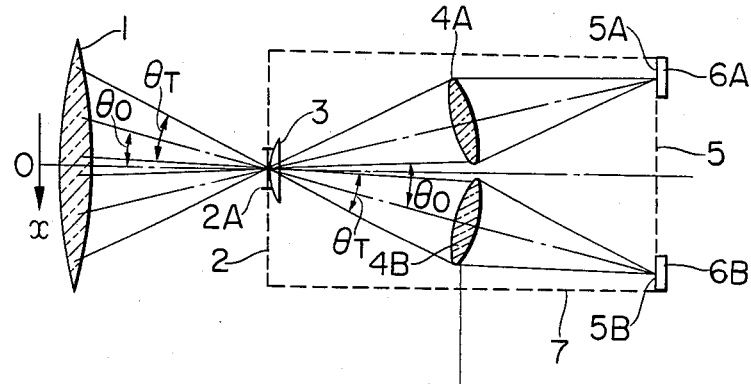
FIGS. 1A and 1B schematically show arrangements of the prior art focus detection optical system employing a pair of refocusing lenses.
Figure 1B:
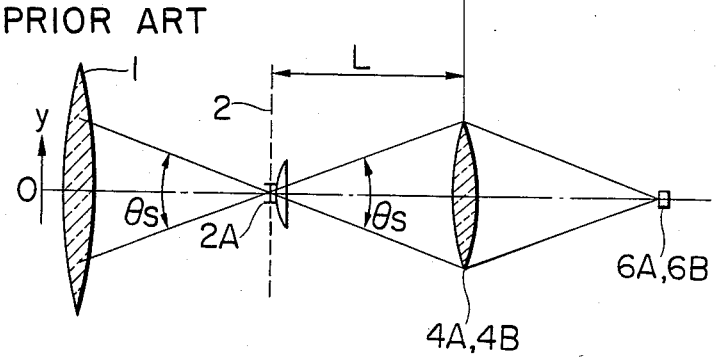

The problem of distortion arises not only in the focus detector of the type including a field lens and using a pair of concave mirrors as that of the present invention but also in the focus detector of the type using a pair of refocusing lenses as shown in FIG. 1. Therefore, the above solution to the problem of distortion is very effective also for the focus detector of the type as shown in FIG. 1. According to the solution, the elements of a photoelectric element array are arranged by changing the pitch in accordance with the local magnification of the secondary image in such manner that the images of a pair of element arrays completely overlap each other on the primary image plane.

In the above-shown embodiment of the present invention there has been used a transparent prism-like block made of a material having a refractive index of n. In other words, the optical path from a field lens to a pair of concave mirrors and the optical path from the pair of concave mirrors to a photo-electric sensor device are filled with a transparent medium having a refractive index n. The advantage obtainable therefrom will hereinafter be described while comparing the embodiment of the invention with the prior art focus detection optical system previously shown in FIG. 2. In order to make the comparison more easily, the arrangement of the reflection type focus detection optical system according to the above embodiment of the invention is shown in a simplified form in FIG. 10 without loss of the identity in principle. In the following description, the optical system shown in FIG. 10 is compared with that shown in FIG. 2. The reflection refocusing optical system disclosed in U.S. Pat. No. 4,384,770 has no field lens in the vicinity of the primary image plane 2A as shown in FIG. 2C. However, when a refocusing optical system is used for focus detection, the provision of a field lens in the vicinity of the primary image plane is important, no matter whether the refocusing optical system uses lenses or concave mirrors. For this reason, in FIGS. 2A, B and 10A, B, the optical system is shown to include a field lens L2.

Figure 2A:
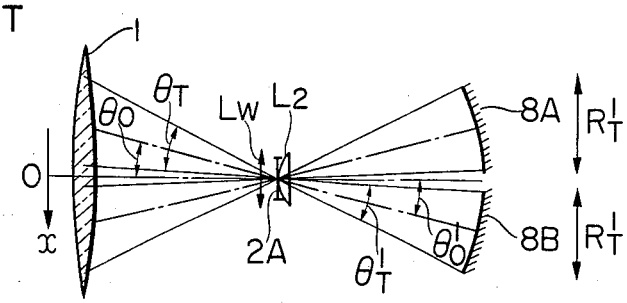
FIGS. 2A, 2B and 2C schematically show arrangements of the prior art focus detection optical system employing a pair of refocusing concave mirrors.
Figure 2B:
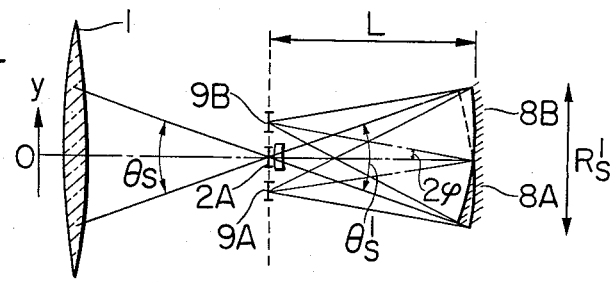
Figure 2C:
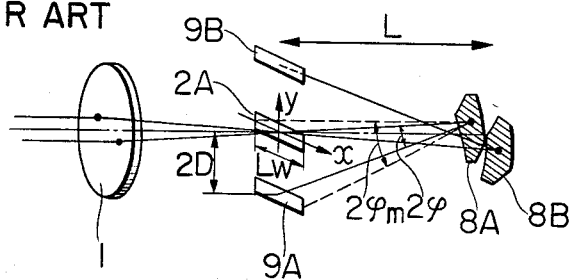

At first the structure of the prior art reflection optical system will be described referring to FIG. 2 in which FIG. 2A is a front view of the optical system and FIG. 2B is a plan view thereof. The refocusing optical system comprises a field lens L2 near the primary image plane and a pair of concave mirrors 8A, 8B the curvature radius of which is L. The pair of concave mirrors is disposed spaced from the field lens L2 by a distance of L. The angle formed by the centers of the primary image plane detection area 2A, the concave mirror 8A (8B) and the secondary image plane detection area 9A (9B) is referred to as the reflection angle. The concave mirrors 8A and 8B are inclined in directions opposite to each other in such manner that both of the deflection angles become 2 $\phi$.

Figure 10A:
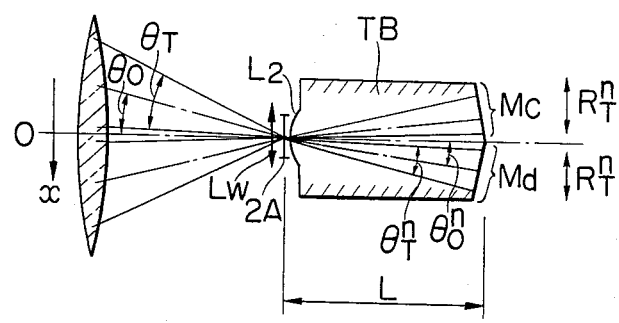
FIGS. 10A and 10B are optical diagrams in which the optical arrangement is simplified to clearly show the optical features of the above embodiment.
Figure 10B:
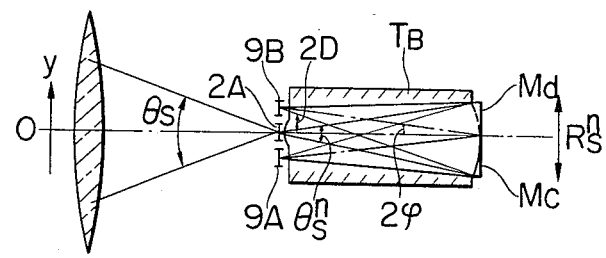

The structure of the reflection type optical system according to the invention is briefly described with reference to FIG. 10 in which FIG. 10A is a front view of the optical system and FIG. 10B is a plan view thereof.

TB is a transparent rectangular parallelopiped block having a refractive index n. The transparent block TB has a field lens L2 on one end surface and a pair of concave mirrors Mc, Md on the opposite end surface. The curvature radius of the concave mirrors is L. Similar to the above, the concave mirrors Mc and Md are inclined in opposite directions to form the same deflection angle of 2 $\phi$.

In order to uniformalize the conditions for comparison between FIGS. 2 and 10, the optical system shown in FIG. 10 is compared with that in FIG. 2 on the following assumptions (1) to (3):

(1) The primary image plane 2A is substantially coincident with the tangential plane at the apex of the field lens L2, (2) The distance between the primary image plane 2A and the refocusing optical system 8A, 8B is equal to the distance between the primary image 2A and the refocusing optical system Mc, Md, which distance is L, and (3) Extension angles of the beams used for detection are $\theta_T$ and $\theta_s$ for both of the optical systems in FIGS. 2 and 10.

Figure 11:
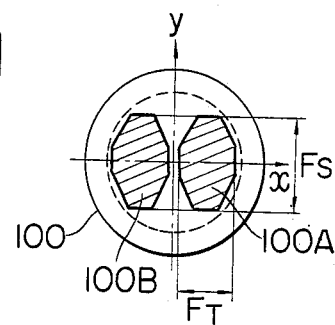
Figure 12A:
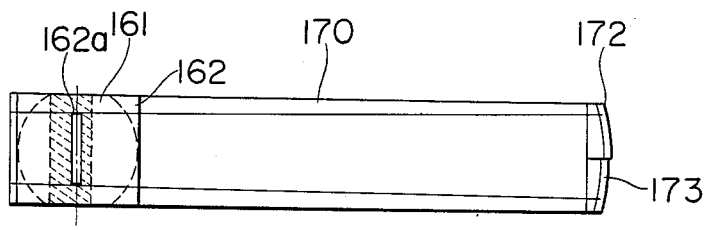
FIGS. 12A, 12B, 12C and 12D show plan view, front view, right side view and left side view of a second embodiment of the invention.
Figure 12B:
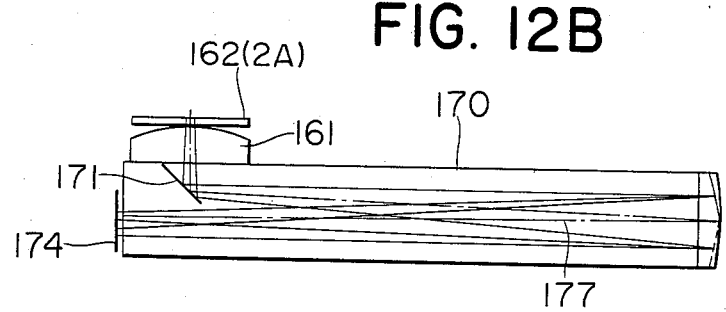
Figure 12D:
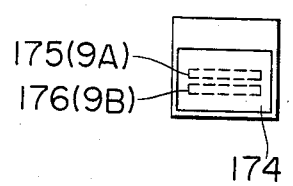
Figure 12C:
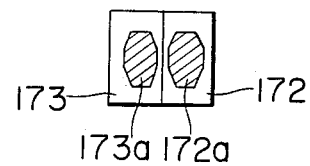

FIG. 11 shows the exit pupil 100 of the photographic lens 1, and two sections 100A and 100B in the pupil 100 used for focus detection. The beam of light transmitted through the pupil section 100A is incident upon the refocusing optical system 8A or Mc. The beam transmitted through the pupil section 100B is incident upon the other refocusing optical system 8B or Md. Brightness (F number) of these pupil sections 100A, 100B is $F_T$ in the x-direction and $F_s$ in the y-direction. The brightness $F_T$, $F_s$ and the above extension angle of detection beam $\theta_T$, $\theta_s$ have the following relationship therebetween:

$$\theta_T = 1/F_T, \theta_s = 1/F_s$$

Further, the detection angle which the center of the detection beam and the optical axis O of the lens 1 form is $\theta_o$. (see FIGS. 2A and 10A)

Under the above conditions the focus detection optical system shown in FIG. 10 is compared with that shown in FIG. 2 with regard to the quality of the secondary images obtained by them.

Spherical aberration, coma and astigmatism of the refocusing optical systems 8A, 8B, Mc, Md vary in magnitude with angle $\theta$ ($\theta_T^1$, $\theta_s^1$, $\theta_T^n$, $\theta_s^n$) wherein $\theta$ the extension angle which the effective aperture of the refocusing optical system and the center of the primary image detection area 2A form. Concretely speaking, the spherical aberration increases in proportion to $\theta^3$, coma aberration does in proportion to $\theta^2$ and astigmatism does in proportion to $\theta$. Further, since the optical axis of the refocusing optical system is not normal to the primary image plane 2A but inclined relative to it, the secondary image is degraded increasingly with the inclination. In FIG. 2, the inclination is equal to the detection angle $\theta_o^1$ and in FIG. 10, the inclination is equal to the detection angle $\theta_o^n$. Therefore, the degradation of the secondary image increases with increasing detection angle.

Beam extension angle and detection angle in FIGS. 2 and 10 will be compared.

Referring first to FIG. 2, detection beams having detection angle $\theta_o$ and extension angle $\theta_T$, $\theta_s$ pass through the field lens L2 and then fall on the refocusing concave mirrors 8A and 8B at the same angles as above, $\theta_o$, $\theta_T$ and $\theta_s$. Therefore, in the case of this optical system, the extension angles $\theta_T^1$ and $\theta_s^1$ related to the refocusing concave mirrors are: $\theta_T^1 = \theta_T$ and $\theta_s^1 = \theta_s$. The detection angle $\theta_o^1$ is: $\theta_o^1 = \theta_o$.

In the case of the optical system shown in FIG. 10, the space from the field lens L2 to the refocusing concave mirrors Mc, Md is filled with a medium of refractive index n. Therefore, the extension angles of the beams incident on the mirrors are values multiplied by $1/n$. Consequently, the extension angle in the x-direction $\theta_T^n$, the extension angle in the y-direction $\theta_s^n$ and the detection angle $\theta_o^n$ become: $\theta_T^n = \theta_T/n$, $\theta_s^n = \theta_s/n$ and $\theta_o^n = \theta_o/n$ respectively.

As readily understood from the above, compared with the refocusing optical system shown in FIG. 2, the beam extension angles and the detection angle in the optical system shown in FIG. 10 are decreased by a factor of 1/n. Thereby the image-forming performance of the refocusing optical system is greatly improved. Furthermore, the reduced extension of the beam enables reduction of the volume of the refocusing optical system. A focus detector having a very compact structure can be thus realized. The optical system shown in FIG. 10 has many other advantages as compared with that shown in FIG. 2, which are as follows:

Field lens, concave mirrors and photoelectric sensors can be fixed directly to the transparent optical block. Higher accuracy in alignment and higher solidity can be obtained. By filling the optical path of the focus detection optical system with a transparent medium of n in refractive index, the necessary size of the concave mirrors is reduced by a factor of 1/n. More concretely, if the optical path is not filled with such transparent medium, the diameters of the concave mirror, $R_T$ and $R_S$ are: $R_T = L \cdot \theta_T = R_T^1$ and $R_s = L \cdot \theta_s = R_s^1$. In contrast, when the optical path is filled with such a transparent medium having a refractive index n, the diameters of the concave mirror become: $R_T = L \cdot \theta_T{}^n = L \cdot \theta_T/n = R_T{}^n$ and $R_s = L \cdot \theta_s{}^n = L \cdot \theta_s/n = R_s{}^n$. As the diameters of the concave mirrors can be reduced in this manner, astigmatism ls and $l_T$ also can be reduced as will be understood from the equation (4) or (5) previously shown. Also, from (7) it is seen that the reduction of mirror diameter makes it possible to select a larger deflection angle for the same degree of astigmatism.

To illustrate the advantages of the reflection type focus detection optical mentioned above, an example is given below as numerical data. The example relates to the case where the focus detection optical system having the optical path filled with a transparent medium of a refractive index n is placed on the bottom of the mirror box of a single lens reflex camera as previously shown in FIG. 3.

$F_S = 6$, $F_T = 8$, $n = 1.8$ and $L = 40$ mm.

Then, the size of each the concave mirror is:

$R_s = L/(NF_s) = 3.7$ mm and
$R_T = L/(nF_T) = 2.8$ mm.

When the deflection angle $2\phi = 0.025 \times 2$ radian, the amount of astigmatism at the center of the secondary image plane detection area becomes:

$$lm = 2 \cdot Rm \cdot \phi^2 = 0.0046 \text{ mm}.$$

This value of astigmatism is extremely small.

When the length Lw of the primary image plane detection area equals 4 mm, Lw = 4 mm, the amount of astigmatism at the marginal portion of the area becomes:

$$lm = 2 \cdot Rm \left\{ \phi^2 + \left(\frac{Lw}{2L}\right)^2 \right\} = 0.023 \text{ mm}.$$

This value of astigmatism is also very small.

If the optical path is not filled with any high refractive index medium and the beam travels in air (n=1) as in the case of the focus detection optical system shown in FIG. 2, the amount of astigmatism lm will become 1.8 times larger than that in the above example with n=1.8, provided that all of other conditions, $F_s = 6$, $F_T = 8$, $L = 40$ mm and $\phi = 0.025$ are maintained. In the case of n=1, if an optical path diagram corresponding to FIG. 5 is prepared using the same data as above, it will be understood that the detection beams can not be separated at the position of the reflecting member 163 in FIG. 5 but they overlap each other there because of their larger extension angle $\theta$. Therefore, in practise, it is required to select a larger value than 0.0025 for $\phi$. Therefore, astigmatism increases accordingly. With increasing the deflection angle $2\phi$, a larger distance is required between the two secondary image plane detection areas (two photo-electric element arrays) 167 and 168 in FIG. 5E. This means, also, undesirable increase of the size of an IC chip.

To fill the optical path from the field lens to the concave mirrors and further to the secondary image plane with a high refractive index medium is significant in providing a better solution to satisfy the conditions of the formulae (8), (9), (10) and (13), (14), (15). By doing so, it is possible to realize a refocusing optical system having good performance with controlled aberrations and a compact structure.

Figure 3B:
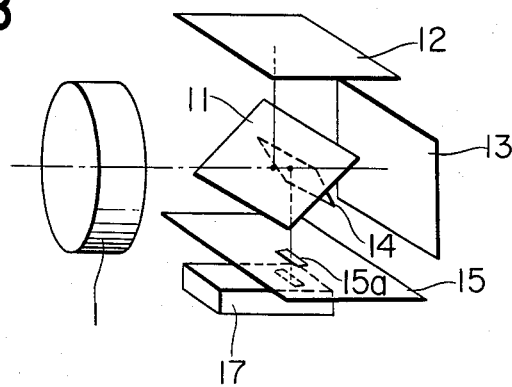

A second embodiment of the present invention will hereinafter be described showing a concrete example of the prism-like block 17 shown in FIG. 3B. In FIG. 3B, the block 17 is disposed under the bottom plate 15 with its longitudinal axis parallel to the optical axis of the photographic lens 1, which optical axis reaches the film plane 13.

Referring to FIG. 12 showing the second embodiment, 170 is a rectangular parallelopiped transparent block having a refractive index n. Like the first embodiment shown in FIG. 5, the block 170 has a field lens 161 cemented to it. Disposed on the field lens is a slotted screen plate 162. Within the transparent block 170 directly under the field lens 161 there is a slant reflection member 171. The reflection member 171 can be prepared in the same manner previously described in connection with the reflection member 163 of the first embodiment. Briefly speaking, the block 170 is cut into two parts along the plane determined for the reflection member 171. Then, a reflecting layer is formed on the exposed surface of the cut block. A pair of concave mirror blocks 172 and 173 are fixed to one end surface of the block 170. The mirror surfaces 172a and 173a on the concave mirror blocks 172 and 173 are bisymmetric to each other relative to the center axis 177 of the block 170 as shown in FIG. 12C. The mirror surfaces are inclined in the same direction but at different inclination angles. The inclination of the reflection surface 173a is larger than that of the reflection surface 172a. In other respects, the concave mirror blocks 172 and 173 are substantially the same as those in FIG. 5. Beams coming from the primary image plane detection area 2A and reflected by the reflection member 171 fall on the concave mirrors 172 and 173. The concave mirrors reflect the beams toward the opposite end of the block 170 while deflecting the beams at different deflection angles respectively. Thus, secondary image plane detection areas 9A and 9B are formed on the opposite end surface of the block to which two photo-electric element arrays 175 and 176 are fixed. The two element arrays 175 and 176 are formed on a common semiconductor chip 174.

In this embodiment the magnitude of aberration of the concave mirror 173 becomes larger than that of the concave mirror 172 because the former has a larger deflection angle than the latter. This causes the problem of diminished identity between the two secondary images. However, this embodiment has an advantage that in the two element arrays 175 and 176 can be located close to each other and therefore the size of the semiconductor chip can be reduced as compared with the above embodiment.

FIG. 13 shows a modification of the second embodiment.

Figure 13A:
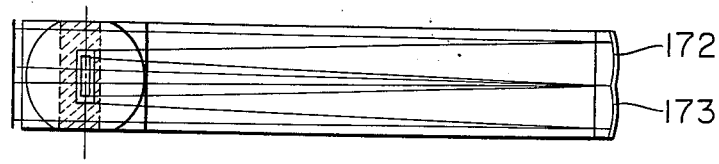
FIGS. 13A, 13B, 13C and 13D show plan view, front view, right side view and left side view of a modification of the second embodiment.
Figure 13B:
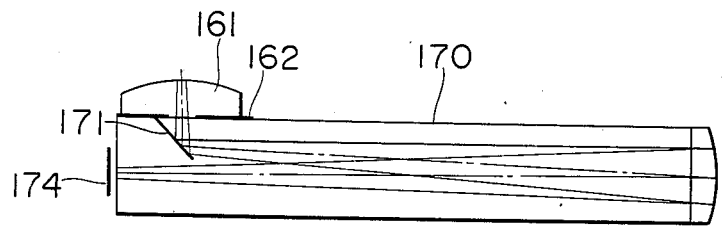
Figure 13C:
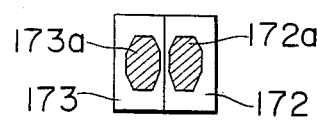
Figure 13D:
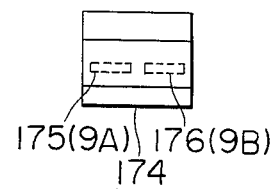

In this figure, a slotted screen plate 162 is disposed between block 170 and field lens 161. A primary image plane lies in the vicinity of the apex of the field lens 161 and only the beam coming from the primary image plane is allowed to pass through the opening of the screen plate 162 after being transmitted through the field lens. All of the rays coming from the area outside of the image plane are blocked out by the screen plate. The beam passed through the opening of the screen plate 162 is incident upon the slant reflection member 171 within the block 170. The beam reflected by the reflection member 171 impinges on the concave mirrors 172 and 173. The two concave mirrors are inclined in opposite directions so that they can form the secondary image plane detection areas 9A and 9B on one and the same straight line as shown in FIG. 13D. To detect the secondary images on the secondary image plane detection areas 9A and 9B there may be used a pair of separate element arrays 175 and 176 or a single element array having a sufficient length to cover the two detection areas 9A and 9B including the space between the two areas.

In this modification, the slotted screen plate 162 is spaced from the primary image plane some distance because it is disposed between the field lens 161 and the block 170. In this manner, a screen plate 162 used to block out the rays coming from the outside of the primary image plane detection area may be placed some distance spaced from the primary image plane without losing the effect.

Figure 14:
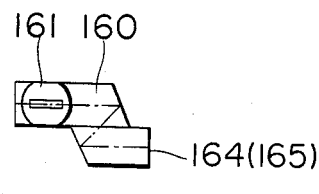
FIG. 14 is a plan view of a modified transparent block.
Figure 15:
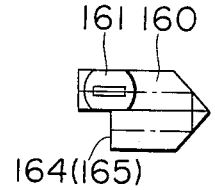
FIG. 15 shows another modification of the transparent block.

In case the transparent block 160 or 170 in the above embodiments is too long to be received in the available space of a camera, the block (160) may be cut into two pieces (160A and 160B) which are afterwards cemented together as desired, for example, in the manner as illustrated in FIG. 14 or 15.

All of the above embodiments a focus detector in which the primary and secondary images have the same size (image magnification of secondary image plane, $\alpha=1$) and therefore the optical path length from primary image plane to concave mirrors is equal to that from the concave mirrors to the secondary image plane. However, it is to be understood that the image magnification is not limited to 1 and any desired magnification value $\alpha$ larger or smaller than 1 can be selected within the scope of the present invention. In particular when a value smaller than 1 is selected ($\alpha < 1$) to form a minified secondary image, some advantages are achieved although the adverse effect of aberration may be increased to some extent as compared with the case of $\alpha=1$. Such advantages obtainable by the selection of $\alpha<1$ are that the size of the secondary image plane detection area can be reduced to $\alpha \times$ size of the primary image, which enables reducing the size of the semiconductor chip for the photo-electric element device, and that the illuminance of the secondary image detection area 5 can be increased to $1/\alpha^2$ times larger than that obtained in the case of $\alpha=1$, which serves to improve S/N ratio. Although the advantages of reduced chip size and increased illuminance on the detection area become larger when a smaller $\alpha$ is selected, if $\alpha < 0.5$, then the deflection angle necessary for beam separation becomes so large as to produce unduly large aberration. In view of the problem of aberration, the preferred range of $\alpha$ for minification is $\alpha \gtrsim 0.6$ and particularly $0.8 \gtrsim \alpha \gtrsim 0.65$.

Figure 16:
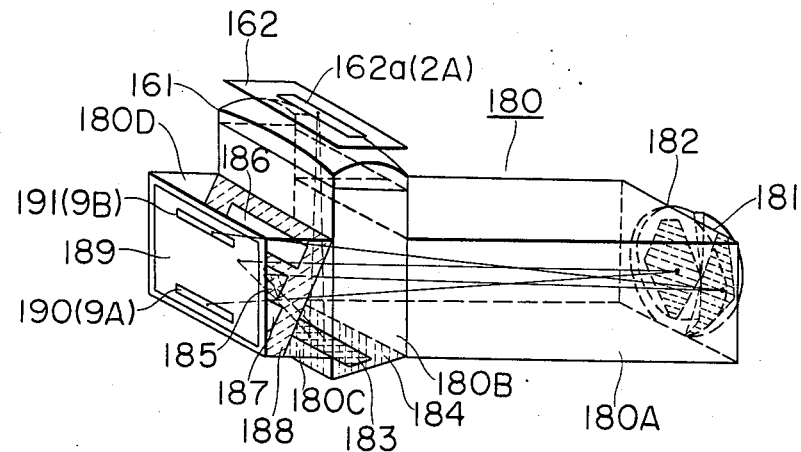
FIG. 16 is a perspective view of a third embodiment of the invention.
Figure 17A:
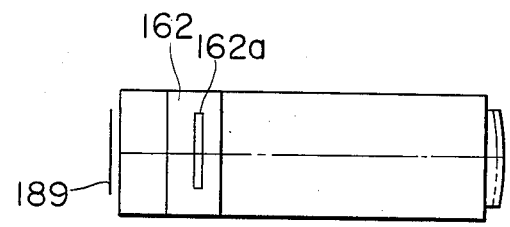
FIGS. 17A and 17B are a plan view and a front view of the third embodiment.
Figure 17B:
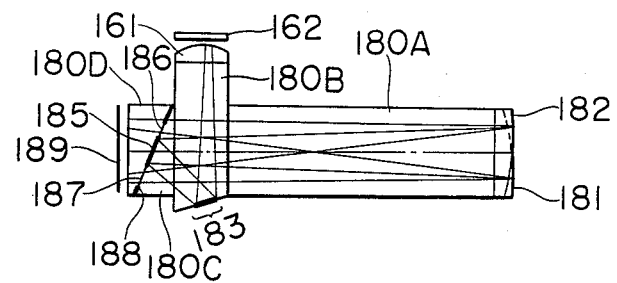

FIGS. 16 and 17 show a third embodiment of the invention in which such a refocusing optical system provided with image minification function is used. FIG. 16 is a perspective view of the embodiment, and FIGS. 17A and 17B are front and plan views thereof.

A transparent block 180 is composed of four pieces of block 180A, 180B, 180C and 180D. The first block piece 180A is a rectangular parallelopiped. A pair of oppositely inclined concave mirror blocks 181 and 182 are bonded to one end surface of the block piece 180A and the second block piece 180B is cemented to the opposite end surface. The upper surface of the second block piece 180B projects beyond the upper surface of the first one 180A. A planoconvex field lens 161 is cemented to the upper surface of the second block piece 180B with the plane surface of the lens being bonded. In the vicinity of the apex of the convex surface of the field lens 161 there is disposed a slotted screen plate 162. The opening 162a of the screen plate is substantially coincident with the primary image plane detection area 2A. The bottom surface of the second block piece 180B is inclined relative to the bottom surface of the first block piece 180A and projected downwardly beyond it. The bottom surface of the second block piece 180B comprises a reflecting surface 183 formed at the middle portion and a light absorbing surface 184 formed at the remaining portion of the bottom surface. The light absorbing surface 184 is provided to remove stray light. The size of the reflecting surface 183 is so measured as to reflect only the detection beam coming from the primary image plane detection area 2A. The third block piece 180C has the shape of a triangular prism and is cemented to the second block piece 180B with the latter between the first and third block pieces 180A and 180C. The slant surface of the triangular prism-like block piece 180C has a reflecting surface 185 formed at the middle, light transmission parts 186 and 187 on both sides of the reflecting surface 185, and a light absorbing surface 188 for removing stray light formed at the remaining portion of the slant surface. The fourth block piece 180D is also in the shape of a triangular prism and the slant surface of the block piece is cemented to the slant surface of the third block piece 180C. On one surface of the fourth block piece 180D opposed to the concave mirrors 181, 182 there is a semiconductor chip 189 bonded to the surface. On the chip 189 there are formed a pair of photo-electric element arrays 190 and 191 so arranged as to cover the secondary image plane detection areas 9A and 9B formed by the concave mirrors 181 and 182 respectively.

The manner of operation of the third embodiment is as follows:

The beam coming through the opening 162a is reflected by the reflecting surface 183 on the bottom of the second block piece 180B and further reflected by the reflecting surface 185 of the block piece 180C to be directed to the concave mirrors 181, 182. The beams reflected from the concave mirrors 181, 182 pass through the light transmission parts 186, 187 to form minified secondary images on the secondary image plane detection areas 9A and 9B respectively.

According to the above embodiment, reduced secondary images can be obtained without rendering the structure of the optical system complicated. Since the primary image plane detection area 2A is formed above the upper surface of the second block piece 180B which has the reflecting surface 183 formed on its bottom surface, the beam coming from the primary image plane detection area 2A reaches the reflecting surface 183 after the beam has completely passed across the space present between the concave mirrors 181, 182 and the photo sensor device 190, 191 thereby elongating the optical path length from the primary image plane detection area 2A to the concave mirrors. Therefore, the optical path length from the primary image plane detection area 2A to the concave mirrors can be made longer than the optical path length from the concave mirrors to the secondary image detection areas without complicating the contour of the block 180 so much.

Further, according to the above embodiment, the generation of stray light can be reduced more effectively than in other embodiments. For example, in the case of the embodiment shown in FIG. 5, there are provided around the reflecting surface 163a not only the light absorbing surface 163d but also light transmitting parts 163d and 163c. With this arrangement, it is impossible to perfectly prevent the generation of stray light. In contrast, in the above third embodiment, the whole bottom surface of the second block piece 180B is formed as a light absorbing surface 184 excepting the central area as the reflecting surface 183. Therefore, stray light can completely be eliminated.

The rectangular parallelopiped form of the transparent optical block 160, 170 or 180 as shown in the above embodiments is very convenient for incorporating the focus detector into a single-lens reflex camera because the block can be placed on the bottom of the mirror box of the camera with the longitudinal axis of the block being nearly parallel to the mirror box bottom plate 15 as shown in FIG. 3A.

Figure 18:
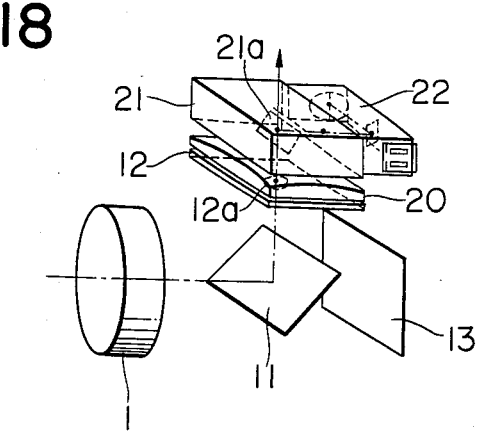
FIG. 18 is a perspective view of a reflection type focus detection block disposed in the vicinity of the finder optical system of a single lens reflex camera.

While the reflection type focus detection block has been shown placed in the bottom of a single-lens reflex camera, it may be placed also in the vicinity of the finder optical system of a single-lens reflex camera. FIG. 18 shows an example of such application.

In FIG. 18, a focusing plate 12 is provided with a field lens 12a formed at the middle. The function of the field lens 12a corresponds to that of the field lens 161 in FIG. 4. Disposed on the focusing plate 12 are a condenser lens 20 and an optical block 21 having a reflecting part 21a at the middle. On the upper surface of the block 21 there is a pentagonal Dach-prism not shown. Disposed on the side surface of the block 21 is a reflection type focus detection block 22 which is substantially the same as the reflection type focus detection block previously shown in FIG. 4 with the exception that the focus detection block 22 is not provided with the field lens 161 and the screen plate 162. The light transmitted through the photographic lens 1 forms a primary image on the focusing plate 12 through a mirror 11. The primary image light is incident on the focus detection block 22 through field lens 12a, condenser lens 20 and reflecting part 21a.

In all of the embodiments previously described, the focus detection optical system has been designed in such manner as to essentially satisfy the following two requirements:

(1) The primary image plane is substantially coincident with the tangential plane at the apex of the field lens; and (2) The optical path from the field lens to the concave mirrors as well as the optical path from the concave mirrors to the photo sensor device is entirely filled with a transparent medium having a refractive index of n.

However, there may be such cases where the optical instrument such as a camera can not satisfy the above two requirements perfectly due to various practical limitations related to the optical instrument. Considering such possibility, the tolerance relating to the two requirements will hereinafter be discussed with reference to FIGS. 19A–19E.

Throughout FIGS. 19A to 19E hatching suggests the presence of a transparent medium of n in refractive index. 2A is a primary image plane detection area, L3 is a field lens, and Me and Mf are concave mirrors as described above. Again, 9A and 9B are secondary image plane detection areas conjugate with the primary image plane detection area 2A with regard to the concave mirrors.

Figure 19A:
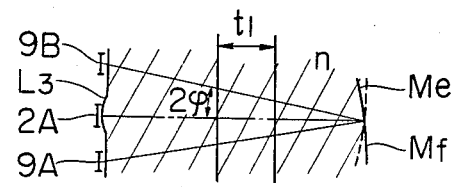
FIGS. 19A, 19B, 19C, 19D, and 19E are optical diagrams illustrating possible cases where air gap or other medium is present in the transparent block according to the invention.

FIG. 19A illustrates the positional relationship of the area 2A, field lens L3, medium n, mirrors Me, Mf and area 9A and 9B of the focus detection optical system which can satisfy the above requirements perfectly.

Figure 19B:
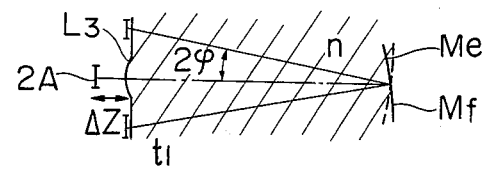

FIG. 19B illustrates a case where the primary image plane detection area 2A is spaced away from the field lens L3 by a distance $\Delta Z$ for any structural reason. The distance $\Delta Z$ has a limit in view of the quality of image formed by the focus detector. When the focus detector is to be used in a single lens reflex camera and the extension of detection beam (see the circle suggested by a broken line in FIG. 11) is about F4, the distance $\Delta Z$ should not be larger than 8 mm. If $\Delta Z$ is smaller than about 4 mm, then fairly good image formation can be assured. It has been found that in practice there arises no problem so long as the distance $\Delta Z$ is less than 2 mm.

Figure 19C:
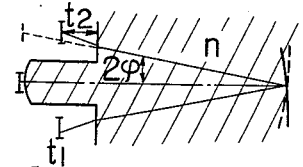

FIG. 19C illustrates a case wherein one end of the transparent medium block was cut out to make a space to receive the photo-electric device. In this case, therefore, the length of the block is shortened by $t_1$ in length as compared with the block shown in FIG. 19A or B. The secondary image plane detection areas are formed at a position distant from the newly formed end surface by the cutout. The distance $t_2 = t_1/n$. It has been found that $t_1$ up to 8 mm is permissible, $t_1$ less than about 4 mm is better and when $t_1$ is less than 2 mm, there is practically no problem. In this connection it should be noted that $t_1$ in the above is the length measured as the medium n and does not means the length as air space. As an example, let the refractive index of the medium n be 1.5–1.9 and $t_1$ be 2 mm. Then, the length $t_1$ obtained by converting into length in air becomes 1.3 mm–1.0 mm.

Figure 19D:
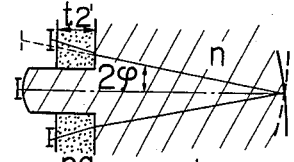

FIG. 19D illustrates a case wherein after cutting out one end of the block for the same reason as in the case of FIG. 19C, the space was filled with a medium ng. In this case, the air gap between the newly formed end surface of the medium n (transparent block) and the secondary image plane detection areas 9A, 9B is filled with the medium ng having a refractive index ng which is different from the refractive index n of the medium n (transparent block). The distance from the interface between the two mediums n and ng to the secondary image plane detection areas 9A, 9B is $t_2' = t_1 \times ng/n$. By filling the air gap with medium ng in this manner, the degradation of image quality can be lessened as compared with the case without filling. Assuming that the degree of degradation in aberration caused by such air gap not filled with medium ng is 1, the degradation will be reduced to about $\{(n/ng)^2 - 1\}/(n^2 - 1)$ by filling the air gap with medium ng. In other words, for the same performance of image formation the length $t_1$ allowable in the case of FIG. 19D (medium ng is filled in) becomes about $(n^2-1)/\{(n/ng)^2-1\}$ times longer than that in the case of FIG. 19C (medium ng is not filled in). An example of medium ng is cover glass with which the light reception surface of the photoelectric element array is covered. If there is still some air gap between the cover glass and the light reception surface, the gap should be less than the limit value mentioned above.

Figure 19E:
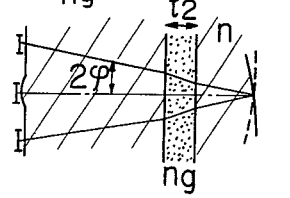

FIG. 19E shows such case wherein a portion of $t_1$ in length of the medium n (see FIG. 19A) was cut off and the space was filled with another medium having a refractive index ng. In this case, the length of filled medium ng is $t'_2 = t_1 \times ng/n$. When the medium ng is air, the cutout length $t_1$ of the medium n should be less than about 8 mm in view of image quality. So long as $t_1$ is less than about 2 mm there is no problem in practice. In this case also the degradation of image quality by aberration can be lessened by using such medium having a refractive index larger than 1 (ng>1) as compared with the case of ng=1. The lessening of the degradation is nearly the same as described above.

As will be understood from the above, a part of the medium of a refractive index n (n>1) used to fill the optical path can be replaced by another medium of another refractive index ng (ng≧1), if necessary. In other words it is not always necessary for the optical path extending from near the primary image plane to the secondary image plane through a pair of concave mirrors to be perfectly filled with a transparent medium of a refractive index n (n>1). This is very advantageous for the manufacture of the focus detection optical system from a practical point of view.

Although all of the examples shown in FIG. 19 relate to the case of image magnification $\alpha=1$, the above discussion is also applicable to the case of $\alpha<1$. However, the allowable range of value $t_1$ in the case of $\alpha<1$ is somehow somewhat narrowed as compared with the case of $\alpha=1$.

As readily understood from the foregoing, the focus detector according to the invention has many advantages over the prior art.

According to the invention, a pair of concave mirrors disposed inclined at a particularly predetermined angle are used to form secondary images. The inclination of the concave mirrors is so selected that the angle of incidence of a beam falling on the centers of the mirrors from the center of the primary image plane detection area is smaller than about $\sqrt{0.04/R}$. The magnitude of astigmatism varies with inclination of the concave mirror. According to the invention it is possible to keep the astigmatism within a desirable range of magnitude. Therefore, with the focus detector according to the invention a high accuracy focus detection is possible. Further, the use of a pair of concave mirrors enables realization of a focus detector of compact structure. The compactness of the system can be further improved by filling the optical path extending from near the primary image plane to the secondary image plane through the concave lenses with a transparent medium having a refractive index n (n>1) while allowing the presence of a limited air gap. By doing so, the diameters of the concave mirrors can be further reduced, which in turn greatly improves the performance in image formation of the focus detection optical system.

Obviously many modifications and variations of the present invention are possible in the light of the above teachings. It is therefore to be understood that within the scope of the appended claims the invention may be practiced otherwise than as specifically described.

I claim:

1. A focus detector for detecting whether or not an image-forming optical system is forming a primary image of an object on or near a predetermined image-forming plane, said focus detector comprising:
    (1) first and second concave mirrors disposed behind said predetermined image-forming plane and inclined at different inclination angles from each other so as to refocus the primary image within a predetermined detection area on or near the predetermined image-forming plane thereby forming first and second secondary images respectively,
    said inclination angles being so determined that each of the incidence angles (randian) of the beams coming from the center of said predetermined detection area and incident on the respective centers of said concave mirrors is smaller than about $\sqrt{0.04/R}$ wherein R is the maximum diameter in mm of said concave mirrors; and
    (2) photo-electric detection means for detecting the relative positional relationship between said first and second secondary images and forming a focus detection signal from the result of the detection.

2. A focus detector according to claim 1, wherein said incidence angle is smaller than $\sqrt{0.02/R}$.

3. A focus detector according to claim 2, wherein said incidence angle is smaller than $\sqrt{0.01/R}$.

4. A focus detector according to claim 1, wherein said focus detector further comprises a field lens disposed in the vicinity of said predetermined image-forming plane, and a transparent medium having a higher refractive index than 1, said transparent medium being filled in the optical path from said field lens to said concave mirrors and also the optical path from said concave mirrors to the light reception surface of said photo-electric detection means while allowing the presence of a small air gap therein.

5. A focus detector according to claim 4 wherein said air gap is less than 1.3–1 mm.

6. A focus detector according to claim 1, wherein the power of said concave mirrors is so selected that the size of each of said secondary images becomes smaller than that of said primary image.

7. A focus detector for detecting whether an image-forming optical system is forming a primary image of an object on or near a predetermined image-forming plane, said focus detector comprising:
    (1) a field lens disposed in the vicinity of said predetermined image-forming plane;
    (2) first and second concave mirrors for reflecting the beam transmitted through said field lens and refocusing said primary image thereby forming first and second secondary images, said first and second concave mirrors being inclined at different angles from each other so as to positionally separate said first and second secondary images from each other;
    (3) first and second photo-electric element arrays for receiving said first and second secondary images respectively;
    (4) detection means for forming a focus detection signal from the outputs of said first and second photo-electric element arrays;
    (5) an elongated transparent block,
    the reflecting surfaces of said first and second concave mirrors being formed on one end surface of said transparent block perpendicular to the length thereof;

one of said first and second photo-electric element arrays and said field lens being disposed close to the opposite end surface of said block, said block having a light pass-through surface substantially parallel to the length of said block, the other one of said field lens and said arrays being disposed opposed to said light pass-through surface; and (6) reflection means disposed within said block to form an optical path binding said concave mirrors and said light pass-through surface.

8. A focus detector according to claim 7, wherein said first and second photo-electric element arrays are disposed close to said opposite end surface of said block and wherein said block is composed of at least two block pieces and the bonded surface of said block pieces includes a reflecting area serving as said reflection means and light-transmitting areas for guiding the reflected light by said concave mirrors to said photo-electric element arrays.

9. A focus detector according to claim 7, wherein said block is composed of at least first, second and third block pieces, said first and second block pieces being plano-convex lenses juxtaposed each having a plane surface cemented to one end surface of said third block piece and a convex surface formed as a reflecting surface serving as said first and second concave mirrors.

10. A focus detector according to claim 7, wherein the air gap allowed to be present in the optical path extending from said field lens to said photo-electric element arrays through said concave mirrors is less than 1.3-1 mm.

11. A focus detector according to claim 7, wherein said block is cut into two pieces and said two block pieces are juxtaposed in close contact.

12. A focus detector according to claim 7, further comprising a common substrate on which said first and second photo-electric element arrays are formed.

13. A focusing detector for detecting whether or not an image-forming optical system is forming a primary image of an object on or near a predetermined image-forming plane, said focus detector comprising:

(1) a block made of a transparent material having a refractive index higher than 1;

(2) a field lens disposed in the vicinity of said predetermined image-forming plane and being in close contact with a first portion of the outer surface of said block;

(3) first and second concave mirrors for refocusing said primary image to form first and second secondary images respectively, said concave mirrors being juxtaposed and inclined at different angles from each other so as to positionally separate said first and second secondary images from each other, and the reflecting surfaces of said concave mirrors being formed on a second portion of the outer surface of said block;

(4) first and second photo-electric element arrays arranged close to a third portion of said block outer surface for receiving said first and second secondary images respectively;

(5) detection means for forming a focus detection signal from the outputs of said first and second photo-electric element arrays;

(6) first optical path-forming means disposed within said block to guide the light passed through said field lens to said first and second concave mirrors; and (7) second optical path-forming means disposed within said block to guide the light reflected by said first and second mirrors to said first and second photo-electric element arrays.

14. A focus detector according to claim 13, wherein said first and third portions are positioned in such manner that they form an angle of about 90 to each other and wherein one of said first and second optical path-forming means has reflection means.

15. A focus detector according to claim 13 further comprising a common substrate on which said first and second photo-electric element arrays are formed.

16. A focus detector for detecting whether or not an image-forming optical system is forming a primary image of an object on or near a predetermined image-forming plane, said focus detector comprising:

(1) a focus detection optical system including a field lens disposed in the vicinity of said predetermined image-forming plane, and first and second refocusing optical systems disposed behind said field lens to refocus said primary image thereby forming first and second secondary images respectively; and (2) first and second photo-electric element arrays to receive said first and second secondary images respectively, each of said photo-electric element arrays being composed of plural photo-electric elements arranged in array, the pitch at which said elements are arranged being locally changed in such manner that the images of the individual elements of said first array formed through said first refocusing optical system and said field lens and the images of the individual elements of said second array formed through said second focusing optical system and said field lens can substantially overlap each other on said predetermined image-forming plane with regard to the corresponding elements of said arrays.

17. A focus detector according to claim 16, wherein said pitch is so selected that on said predetermined image-forming plane, the images of the individual elements formed through said first refocusing optical system can be present at equal intervals.

18. A single lens reflex camera comprising:

(1) a phototaking optical means;

(2) a quick-return mirror for reflecting a portion of the light transmitted through said phototaking optical means and allowing the remaining portions of the light to pass through it;

(3) an auxiliary mirror for reflecting the light passed through said quick-return mirror downwardly to form a primary object image through said phototaking optical means at a position under said mirror and in the vicinity of said predetermined image-forming plane;

(4) a bottom plate disposed under said quick-return mirror, said plate being provided with an opening formed therein;

(5) a field lens disposed in the vicinity of said predetermined image-forming plane;

(6) first and second concave mirrors for reflecting the light passed through said opening and said field lens and refocusing said primary image to thereby form first and second secondary images, said first and second concave mirrors being inclined at different angles from each other so as to positionally separate said first and second secondary images from each other;

(7) first and second photo-electric element arrays for receiving said first and second secondary images respectively;

(8) detection means for forming a focus detection signal from the outputs of said first and second photo-electric element arrays;

(9) an elongated transparent block disposed under said bottom plate with the longitudinal axis of the block being substantially parallel to said bottom plate, the reflecting surfaces of said first and second concave mirrors being formed on one end surface of said block perpendicular to the longitudinal axis of said block, said first and second photo-electric element arrays being disposed close to the opposite end surface of said block, and said block having a light pass-through surface extending substantially parallel to the longitudinal axis of said block, on which surface the light transmitted through said field lens is incident; and

(10) reflection means disposed within said block to reflect the light coming from said light pass-through surface toward said concave mirrors.

19. A focus detector for detecting whether an image-forming optical system is forming a primary image of an object on or near a predetermined image-forming plane, said focus detector comprising:

(1) an elongated transparent block having a first light pass-through surface at one end approximately perpendicular to the length thereof and a second light pass-through surface substantially parallel to said length, the light passed through said image-forming optical system entering said block through one of said first and second light pass-through surfaces;

(2) reflection means disposed within said block to form an optical path binding said second light pass-through surface and the other end surface opposite to said one end;

(3) first and second concave mirrors formed on the other end surface of said block for reflecting the light entering said block and for refocusing said primary image thereby forming first and second secondary images, said first and second concave mirrors being inclined at different angles from each other so as to positionally separate said first and second secondary images from each other;

(4) first and second photo-electric element arrays disposed close to the other of said first and second light pass-through surfaces; and (5) detection means for forming a focus detection signal from the outputs of said first and second photo-electric element arrays.

20. A focusing detector for detecting whether or not an image-forming optical system is forming a primary image of an object on or near a predetermined image-forming plane, said focus detector comprising:

(1) a block made of a transparent material having a refractive index higher than 1, said block having, on an outer surface thereof, first, second and third portions different in location from each other, the light which is passed through said image-forming optical system entering said block through said first portion;

(2) first and second concave mirrors for refocusing said primary image to form first and second secondary images respectively, said concave mirrors being juxtaposed and inclined at different angles from each other so as to positionally separate said first and second secondary images from each other, and the reflecting surfaces of said concave mirrors being formed on said second portion of said block;

(3) first and second photo-electric element arrays arranged close to said third portion of said block for receiving said first and second secondary images respectively;

(4) detection means for forming a focus detection signal from the outputs of said first and second photo-electric element arrays;

(5) first optical path-forming means disposed within said block to guide the light passed through said first portion to said first and second concave mirrors; and (6) second optical path-forming means disposed within said block to guide the light reflected by said first and second mirrors to said first and second photo-electric element arrays.

21. A focusing detector according to claim 20, further comprising a field lens formed on said first portion of said block.

22. A single lens reflex camera comprising:

(1) a phototaking optical means;

(2) a quick-return mirror for reflecting a portion of the light transmitted through said phototaking optical means and allowing the remaining portions of the light to pass through it;

(3) an auxiliary mirror for reflecting the light passed through said quick-return mirror downwardly to form a primary object image through said phototaking optical means at a position under said mirror;

(4) a bottom plate disposed under said quick-return mirror, said plate being provided with an opening formed therein;

(5) first and second concave mirrors for reflecting the light passed through said opening and refocusing said primary image to thereby form first and second secondary images, said first and second concave mirrors being inclined at different angles from each other so as to positionally separate said first and second secondary images from each other;

(6) first and second photo-electric element arrays for receiving said first and second secondary images respectively;

(7) detection means for forming a focus detection signal from the outputs of said first and second photo-electric element arrays;

(8) an elongated transparent block disposed under said bottom plate with the longitudinal axis of the block being substantially parallel to said bottom plate, the reflecting surfaces of said first and second concave mirrors being formed on one end surface of said block approximately perpendicular to the longitudinal axis of said block, said first and second photo-electric element arrays being disposed close to the opposite end surface of said block, and said block having a light pass-through surface extending substantially parallel to the longitudinal axis of said block, on which surface the light transmitted through said opening is incident; and

(10) reflection means disposed within said block to reflect the light coming from said light pass-through surface toward said concave mirrors.

23. A single lens reflex camera according to claim 22, further comprising:
a field lens formed on said light pass-through surface of said block.

24. A focus detector for detecting whether or not an image-forming optical system is forming a primary image of an object on or near a predetermined image-forming plane, said focus detector comprising:
(1) a focus detection optical system including first and second refocusing optical systems for refocusing said primary image thereby forming first and second secondary images respectively; and
(2) first and second photo-electric element arrays to receive said first and second secondary images respectively, each of said photo-electric element arrays being composed of plural photo-electric elements arranged in array, the pitch at which said elements are arranged being locally changed in such manner that the images of the individual elements of said first array formed through said focus detection optical system and the images of the individual elements of said second array formed through said focus detection optical system have the same pitch on said predetermined image-forming plane.

* * * * *